March 11, 1924.

R. W. CUTHBERTSON

PIT TUB

Filed Aug. 22, 1921

1,486,515

WITNESSES :-
Edward Mears
John Smith

INVENTOR :-
R. W. Cuthbertson
By Chatwin Company
Attys

Patented Mar. 11, 1924.

1,486,515

UNITED STATES PATENT OFFICE.

ROBERT WILLIAM CUTHBERTSON, OF CHEQUERBENT, NEAR BOLTON, ENGLAND.

PIT TUB.

Application filed August 22, 1921. Serial No. 494,445.

*To all whom it may concern:*

Be it known that I, ROBERT WILLIAM CUTHBERTSON, a subject of the King of England, residing at Chequerbent, near Bolton, have invented new and useful Improvements in Pit Tubs, of which the following is a specification, and for which I have received a British Patent No. 4055/14, dated 17th Feb., 1914.

This invention relates to pit-tubs, and one of my objects is to provide a novel construction of a body for pit-tubs having the form of an open tank of the type constructed of plates joined together at their meeting edges by bent flanges or lips firmly secured by straddling clips.

Heretofore, the said flanges of tanks and the like have been bent outwards so as to project externally of the tank or other structure and the clips have been applied on the outside thereof so that projecting parts or ribs existed which in certain conditions are found to be objectionable.

Another of my objects is to overcome the aforenamed objectionable features and to construct the body of pit-tubs by means of removable plates temporarily secured together by flanges and clips located at the interior of the pit-tub, thus avoiding outside projections.

In the accompanying drawing:—

Figure 1:
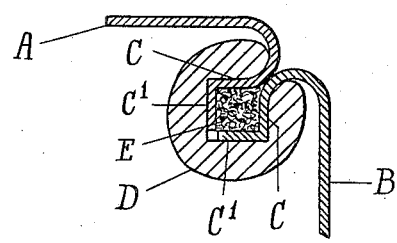
Figure 2:
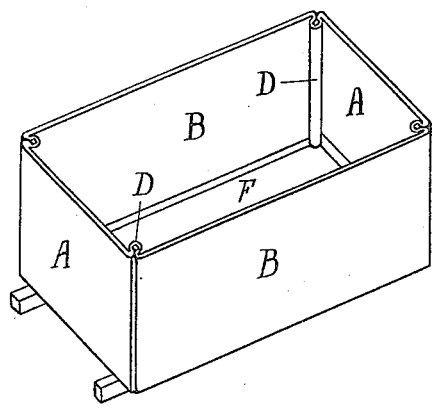

Figure 1 is a cross-section illustrative of a corner portion of the body of a pit-tub according to one embodiment of my invention; and Fig. 2 is a perspective view, drawn to a smaller scale, of the complete body of the improved pit-tub.

Referring to these drawings, in which similar letters refer to similar parts in both figures, the heads or end plates A and side plates B are formed with inturned flanges C having an off-turned lip $C^1$. The adjacent flanges C and lips $C^1$ of two adjoined plates, such as A and B, form an internal square bead at each corner and around which is firmly pressed a clip D. By reason of the rough usage to which pit-tubs are generally subjected, it is advisable to force a wedge or filling E into the hollow portions of the bead. The bottom plate F is secured to the side plates B in a similar manner, by a bead and clip D shortened or cut away sufficiently to avoid obstruction from the vertical corner beads and clips.

With the constructional arrangement of pit-tubs according to this invention all external flanges and similar projections are avoided and the corner joints have a rounded formation presenting an angle of about 45 degrees with the outer face of the plates.

Moreover the plates for the body of pit-tubs can be prepared and then delivered at the mouth of the hauling shaft or well ready for immediate assemblage by clips, applied by unskilled persons, the separate plates being easily packed in compact form, thus saving space and cost of carriage.

I claim:

A corner joint for use in assembling plates to form a pit tub, comprising rounded inturned edges to said plates, an extension of each said inturned edges parallel to said plate, an integral lip offset from said extension, said extension and lip forming a V-shaped trough which with assembled plates produces a bead of square section, a clip around said bead and a filling within the bead tending to press the V-shaped portions outward against the clip.

ROBERT WILLIAM CUTHBERTSON.